Oct. 27, 1936.    C. F. STAUFFER ET AL    2,058,736
AUTOMATIC SELECTIVE SPEED TRANSMISSION
Filed June 25, 1932    4 Sheets-Sheet 4
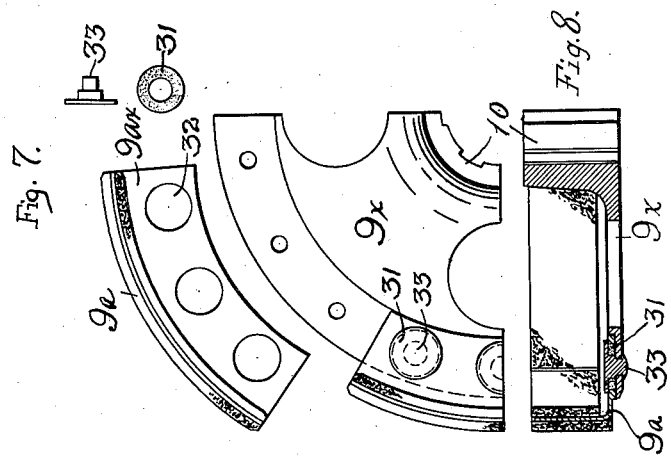
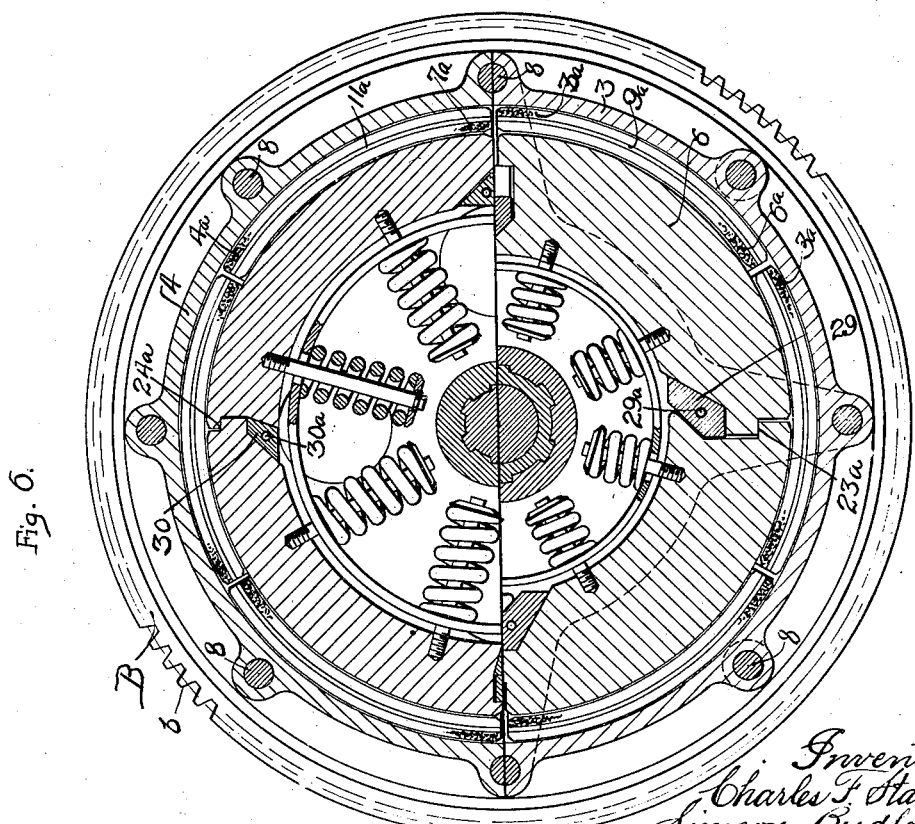

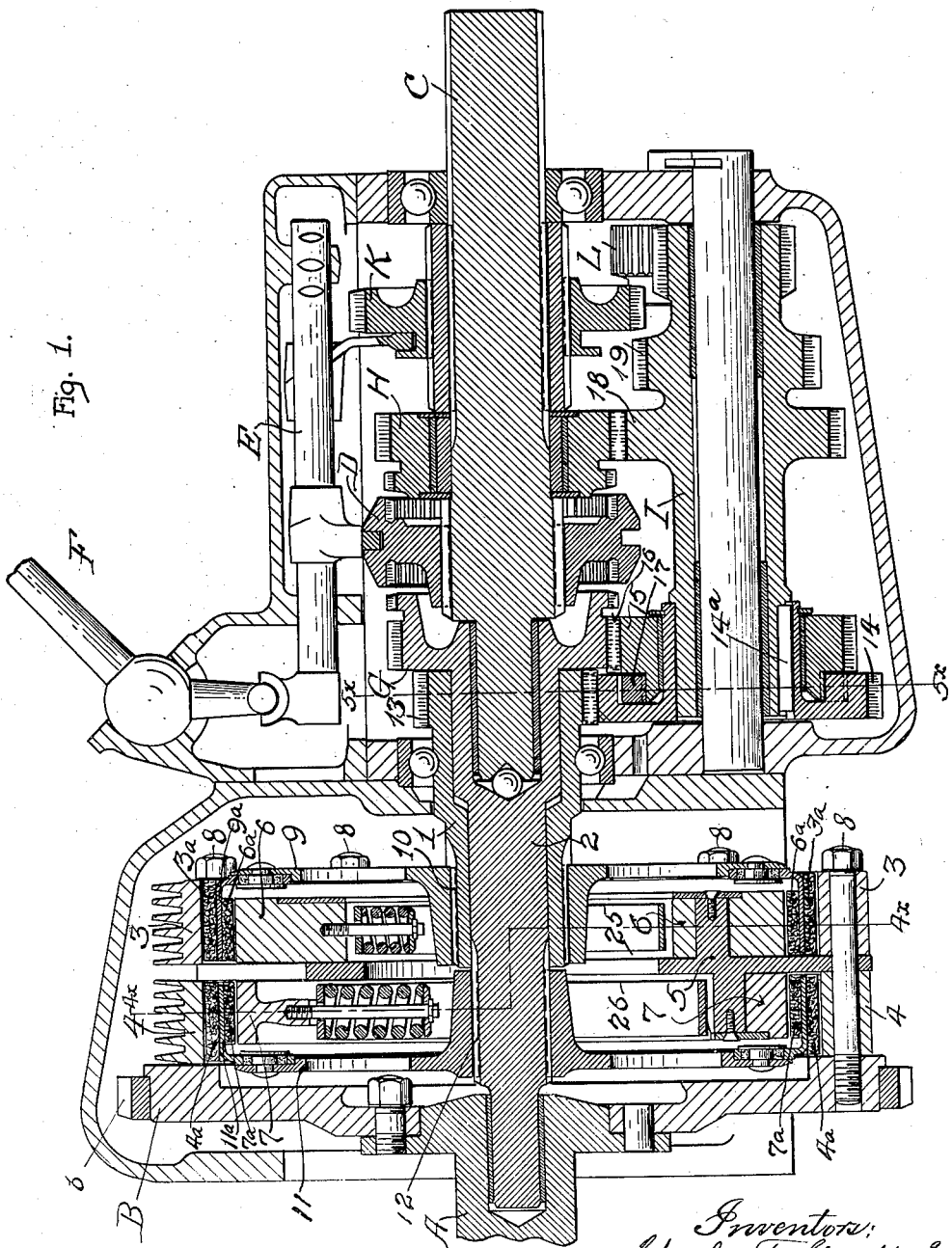

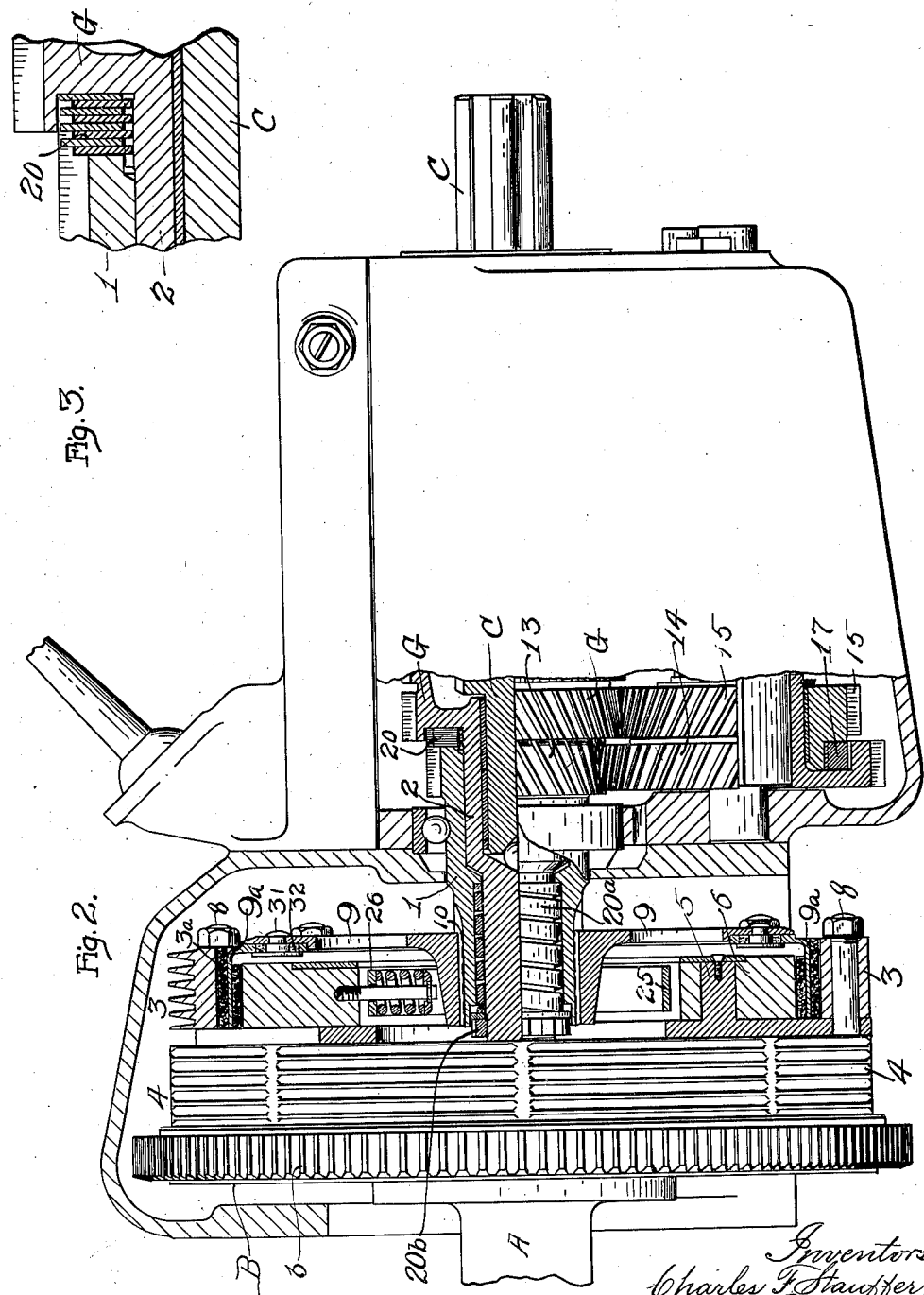

Patented Oct. 27, 1936

2,058,736

UNITED STATES PATENT OFFICE 2,058,736

AUTOMATIC SELECTIVE SPEED TRANSMISSION

Charles F. Stauffer, River Forest, and Simeon Budlong, Chicago, Ill.; said Stauffer assignor of twenty two-hundredths to Emil Barre, and ten two-hundredths to James N. Budlong, both of Chicago, Ill.

Application June 25, 1932, Serial No. 619,236

3 Claims. (Cl. 74—336)

This invention relates to a means for transmitting power from an engine to a shaft driven thereby at speed ratios varying appropriately to the resistance encountered by the shaft.

One object of the invention is to provide an improved means for automatically determining the ratio of movement in the driving and driven parts, to which end, the invention proceeds upon the principle of having a plurality of automatically controlled clutches through which, respectively, a flywheel or other engine-actuated member may drive a plurality of transmitting members that determine the speed ratios; these automatically controlled clutches being so designed that they will establish drive at different speeds of the fly-wheel; but instead of having these clutches arranged in series in the sense that one drives through the other, the present invention introduces the important feature of combining, in a novel manner, independent transmitting members with two clutches arranged in parallel, so that each clutch may impart motion to the ultimate driven shaft independently of the other; and the further novelty, incidental thereto, of having the centrifugal actuating elements of the respective clutches both driven by and with a fly-wheel as an incident to the said parallel arrangement, but in such manner that when the engine is running at a relatively low speed, the low speed drive clutch will act to establish its drive, which is transmitted through suitable reduction gear to the driven shaft, and the high speed or one-to-one clutch will establish its drive only after the engine has picked up speed to a predetermined degree; the said one-to-one drive being transmitted directly to the same driven member or shaft which the low speed drive clutch reaches only through reduction gearing; an overrunning clutch being introduced in the low speed transmission to compensate for simultaneous parallel drive by the two transmissions of different ratio and permit the direct or one-to-one drive to run ahead of the reducing drive.

Another object of the invention is to provide what we call a compromise automatic speed change driving gear, only a portion of whose variable driving functions will be automatically selected while the remainder will be manually selected, so that while the power consuming element will automatically select its gear shift under running conditions involving frequent slowing down, turning of corners, interruption by traffic regulations and the like, provision will also be made for manual selection for instance, through means of a shiftable dog clutch member or the like of another low ratio drive not involving the overrunning clutch for use in holding back the vehicle by the engine in descending steep grades and, preferably, so designed that it will provide for a materially lower ratio of drive than the automatically selected low ratio drive; a collateral feature of the preferred embodiment of this part of the invention residing in the combination of a portion of the automatically selected low speed drive (not including the overrunning clutch) with reduction gears of the manually selected low speed drive in order to get a double reduction when conditions require. Still another novel feature of this part of the invention resides in the use of a speed reducing portion of the automatically selected low speed drive in series with the reverse drive which is, of course, voluntarily selected; and another novelty incident to this part of the invention consisting in utilizing the voluntary shifted dog clutch or its equivalent to establish the low speed series voluntarily selected drive, as well as low speed series, voluntarily selected reverse drive. Still another novel feature incident to this part of the invention consists in utilizing an intermediate reduction member of the low ratio, automatically selected drive as a part of the train of connections to the low speed, voluntarily selected drive clutch as well as to the reverse clutch.

For purposes of illustration, this specification discloses a novel construction of clutch which functions with special advantage in coordination with several of the functions identifying the mechanism claimed herein: and this clutch, as one such instrumentality suitable for such claimed mechanism, will be briefly described in detail hereinafter.

In order that the invention may be more fully understood, an illustrative embodiment thereof will now be described in detail in connection with the accompanying drawings, in which—

Figure 1 is a vertical axial section showing the application to a standard variable speed driving mechanism of parts which convert it into a transmission embodying the principles of the present invention.

Figure 2 is an elevational view, partly in section, of the transmission shown in Figure 1, modified to include a torque resistance clutch through means of which high ratio drive will be continued so long as load resistance renders it appropriate, and notwithstanding a reduction in speed sufficient to release the high speed centrifugal clutch.

Figure 3 is an axial sectional view showing a detail of the torque resistance clutch.

Figure 5 is a transverse section on the line 5x—5x of Figure 1, showing in detail the overrunning clutch which permits the low speed centrifugal clutch and reduction drive to continue in engagement and mesh after the high speed centrifugal clutch is thrown in and while the drive is being transmitted at one-to-one ratio at such other high speed as may be provided for.

Figure 4:
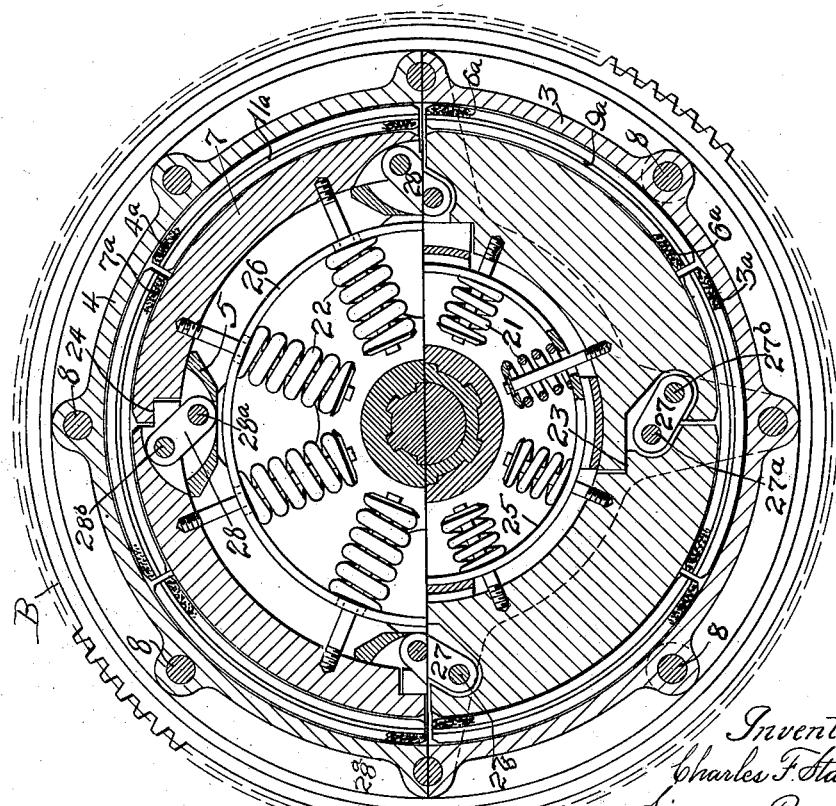
Figure 4 is a transverse section on the line 4x—4x of Figures 1 and 2, and showing by the upper half of the section the high speed centrifugal clutch, and by the lower half of the section the low speed centrifugal clutch.

Figure 6 is a view similar to Figure 4, showing modified details in the construction of the two clutches, and particularly those portions thereof which enforce simultaneous engaging and disengaging movements of the clutching units, and developed from such movements limited circumferential movements that insure gripping of the clutch elements during acceleration of the engine relatively to the vehicle or other power consuming unit and cause temporary disengagement during synchronization incident to deceleration of the engine relatively to the power consuming unit.

Figure 7 is a segregated detail view of portions of the gripped or driven member of the clutch, including resilient means rendering it expansible and shock absorbing; and Figure 8 is a partial axial section of parts shown in Figure 7 assembled as in use.

In the embodiment here selected for illustration, A represents a portion of an engine driven shaft; B a conventional fly-wheel mounted thereon and provided with teeth b for receiving the pinion of a starting motor; C the driven shaft which, in an automobile, will be connected in conventional manner with the driving axle or axles and here typifies a power consuming unit; D represents a shiftable dog-clutch member keyed to but axially slidable upon shaft C in response to the slide shaft E and gear shift lever F; G represents the high speed transmitting member with which the clutch member D may be thrown into mesh to establish a one-to-one or other high ratio drive; H represents an idler pinion stationarily located upon but rotatable relatively to shaft C with which the clutch member D may be thrown into mesh by rearward movement and which stands in driven relation to a conventional reduction gear countershaft I; and K represents a reverse gear slidably keyed upon shaft C and adapted to be thrown into and out of mesh with a reversing idler L that stands in mesh with the countershaft I. The parts as thus far described may be of conventional form and, therefore, have been shown generally rather than in specific detail. They may be taken as representing one form of transmission mechanism in which the subject-matter of the present invention may be embodied and which, when combined with the invention in accordance with certain of the novel features herein described, becomes a new instrumentality for accomplishing new results.

The clutch employed in connection with the present invention may be of any construction so long as it is capable of delivering two independent characteristic outputs of power under described circumstances of speed and torque resistance, to the high and low speed transmission members, respectively. The clutch herein shown in use for that purpose will now be described. 1 represents a low speed transmission member and 2 a high speed transmission member arranged concentrically with but rotatable relatively to the engine shaft A and the power consuming member C. 3 and 4 represent stationary jaws, respectively of the low speed and high speed clutches; and 5 represents a spider common to both these clutches, which carries concentrically responsive movable jaws 6 and 7 of said clutches. Bolts 8 secure the stationary jaws 3 and 4 and spider 5 to the fly-wheel B, so that all of said parts are compelled to revolve at fly-wheel speed. 9 represents a driven member of the low speed clutch which is keyed at 10 to the low speed transmission member 1; and 11 represents the driven member of the high speed clutch which is keyed at 12 to transmission member 2. The driven clutch members 9 and 11 are provided with circumferential flanges 9a and 11a, respectively, located between the stationary jaw 3 and movable jaw 6 of the low speed clutch and the stationary jaw 4 and movable jaw 7 of the high speed clutch; which said pairs of jaws are provided with friction facings 3a, 6a and 4a, 7a to adapt the jaws to grip said flanges and impart flywheel rotation to the driven members 9 and 11, when centrifugal action commensurate with flywheel rotation and acting with forces, respectively, determined by the masses of the movable jaws 6 and 7, cause the pairs of jaws to close into gripping relation to the said flanges. Each of the movable jaws 6 and 7, as will hereinafter appear, comprises an annular structure subdivided into segments in order to permit the member to expand under centrifugal movement and grip the driven member flanges, as referred to.

When under relatively low fly-wheel speed the low speed clutch 3, 6, 9 imparts rotation to low speed transmitting member 1, a pinion 13 carried by the latter drives the relatively larger and therefore speed reduction gear wheel 14 which, in turn, drives the concentric smaller pinion 15 that meshes at 16 with the relatively larger drive gear G already referred to, so that if the shifting member D be thrown into mesh with gear G, automatically selected low speed forward drive will now be imparted to the power consuming member C or to the drive wheels of a vehicle with which it may be connected.

Figure 5:
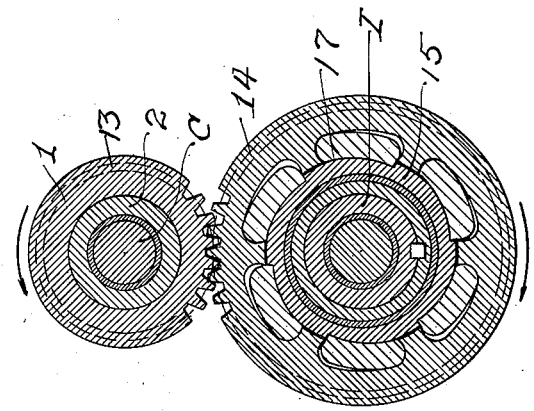

After the speed of the fly-wheel B increases to an appropriate R. P. M., the movable jaw 7 of the high speed clutch will respond to centrifugal force to grip the high speed driven member 11 and thereby drive high speed transmitting member 2 which carries the gear wheel G, and the latter will then determine the speed of drive transmitted to member C. This high speed drive follows notwithstanding the continued functioning of the low speed clutch 3, 6, 9, since at a suitable point between the low speed clutch and the driving gear G, for instance, between the gear wheel 14 and the pinion 15, there is located an overrunning clutch 17 (see Figure 5) which permits pinion 15 to be driven ahead of gear wheel 14. Hence, the present invention contemplates a plurality of automatically selective clutches interposed between the power producing and power consuming elements of the transmission, arranged in parallel in the sense that each is adapted to drive independently of the other, and both may perform their clutching functions at the same time without the low speed drive holding back the high speed drive, but with the low speed drive remaining in position to assume the drive whenever the high speed clutch relinquishes control.

For so much of the operation, gear wheel 14 and pinion 15 need only be mounted with freedom of rotation; but for additional functions performed in accordance with collateral features of the present invention, gear wheel 14 is keyed at 14a to the countershaft I so that the reducing portion 13, 14 of the automatically selected low speed drive (excluding the overrunning clutch 17) will also serve to impart rotation through gear 18 to the gear wheel H, which said gear wheel H, while idling about the power consuming element C whenever the drive is through gear wheel G, will become a part of the forward driving connection when shift member D is thrown into mesh with the clutch of gear wheel H, and thereby complete a manually selected positive low (conventionally termed intermediate) speed driving connection between the fly-wheel and the power consuming member which includes a portion of the automatically selected low speed drive and may be used to check the momentum of an automobile from the engine in descending steep grades or, with proper design of gear ratios, may constitute a higher power forward drive than that which is secured by the automatically selected low speed drive alone. In a similar manner, countershaft I, driven by automatically selected low speed drive, may be used to operate still another forward drive similar to the first speed of the normal automobile transmission; to which end, countershaft I is provided with another pinion 19 adapted to receive the pinion K when the latter is moved forward by the combined left-hand rocking movement and forward sliding movement of slide shaft E; and this low or first speed drive I, 19, K, being in series with the automatically selected speed reduction 13, 14, constitutes the extreme high power forward drive of the system, according to the design selected for illustration.

Reverse drive, as already stated, is attained by throwing the slide gear K rearward with the gear shift lever F rocked to the left, and this, too, is in series with the automatic low speed drive 13, 14 and therefore involves ample power for all reverse purposes.

From the foregoing, it will be seen that an important condition contemplated by the present invention is utilization of the automatically selected low and high speed drives to the exclusion of the positive, manually selected, low speed hold-back drive; manually selected, positive first speed drive; and manually selected reverse drive. It will also be seen that these three additional drives, corresponding to drive normally provided in automobile transmission, are, respectively, in series with speed reducing gears of the automatically selected, low speed drive. Thus the apparatus described constitutes a combination of an automatic variable speed transmission and a conventional H-shift type of manually selective transmission, wherein the manual shifting lever of the manual transmission, in addition to its usual function, serves as a governing or conditioning means for the automatic transmission. Due to the close relationship of the automatic and manually selective transmissions, both structurally and in matters of function and control, certain of the elements described function as a part of both transmissions. For example, the clutch 3 and its associated gearing 13, 14 function in the low speed of the automatic operation as well as in the low, intermediate and reverse drives of the manually selective transmission. Similarly, the element D, when in its forward position, acts as a part of the automatic transmission, and forms the high speed drive of the manually selective transmission, while in its rear position it acts as a part of the positive or non-over-running intermediate drive.

As shown in Figures 2 and 3, the automatically selected low and high speed drives herein described lend themselves with special advantage to use in combination with an automatically disengaged torque resistance clutch, whereby the low speed transmission member 1 may enter into direct driving relation to the high speed transmission member 2, namely, through means of a friction clutch 20 introduced at some suitable point, such, for instance, as between the rear end of transmission member 1 and the gear wheel G; which clutch will cause low speed transmitting member 1 and high speed transmitting member 2 to revolve in unison under the drive of low speed clutch 3, 6, 9, accompanied by overrunning movement at clutch 17, until such time as torque resistance shall be sufficient to cause slipping of the clutch 20 and pick-up of drive through overrunning clutch 17, which results in the transmission of torque resistance back through gears G, 15, 14, and 13 so as immediately to cause an axially forward displacement of pinion 13 by reason of the angularity of its teeth through which it engages with a gear wheel 14, and torque resistance clutch 20 is thereby thrown out and leaves the automatically selected low speed drive to continue through the speed reduction gears 13, 14, 15 and G. The clutch 20 is urged toward closed position by a spiral spring 20ª which surrounds the high speed transmission member 2 and acts between an adjustable nut 20ᵇ on the member 2 and an internal shoulder on the member 1.

The driving function of the torque resistance clutch 20 will ordinarily occur only on deceleration following a drive through the high speed clutch, when the vehicle has momentum and road conditions are such as to impose low torque resistance. It is desirable at such times, for the reason that it continues a one-to-one drive after the high speed clutch 4, 7, 11 has, by fall in centrifugal force, been released from its gripping function.

As shown in Figure 4, which is an irregular section taken one-half through the high speed clutch and the other half through the low speed clutch, the stationary clutch members 3 and 4 will be in the form of rigid rings, secured by bolts 8 to the fly-wheel B and having inwardly presented faces that receive linings of frictional material 3a, 4a on the outer faces of the flanges 9a, 11a of the driven members 9 and 11; also the movable jaws 6 and 7 of these clutches constitute in each instance an annular series of segments having sufficient mass to cause them to move by centrifugal force in opposition to retracting springs 21, 22 and thereby press their outer faces against the friction linings 6a, 7a on the inner faces of the flanges 9a, 11a to complete the clutching operation. The segments 6 and 7, however, are interlocked at their meeting ends through means of overlapping shoulders 23, 24 that cause all the segments of the complete annular jaw to move outwardly in unison; and to further insure this effect as well as to evenly distribute gripping pressure throughout the annulus of a jaw, springs 21, 22 are supported, not through fixed bearings but by a floating member 25, 26 in the form of a continuous ring, in such manner that spring pressure on one side is transmitted to the opposite side of the spring and resistance, which must be overcome by centrifugal force in applying the movable jaw, is uniform throughout the annulus.

A further important feature of the matter of disposing of the centrifugal segments which make up the movable jaw of a clutch, resides in the provision of the support between one end of each segment and the spider 5, whereby outward movement of a segment is caused to be accompanied by a limited circumferential movement of the jaw relatively to the flange (9a or 11a) of the driven member (9 or 11) of the clutch in the direction opposite to rotation of the fly-wheel, so that on establishing contact between the movable jaw and the driven member, the grip of the jaw is automatically tightened by a toggle action; and, conversely, when deceleration of the engine takes place relatively to the momentum of the car and the drag upon the clutch is in the opposite direction, there will be a series of momentary releases of the clutch until synchronizing is attained between the speed of the driving and driven parts of the clutch. According to Figure 4, the means for developing this toggle action consists of a series of links 27, 28, pivoted, respectively, at 27a, 28a to the spider 5, and at 27b, 28b to the segments 6 and 7. Only one toggle link 27, 28 is used for each segment, since the opposite end of the segment rests upon the shoulder 23 or 24 of the next adjacent segment and causes the segments to move bodily and uniformly throughout their arcuate dimensions.
According to Figure 6, the toggle effect upon the segments of the movable jaws and the clutches is developed by means of camming blocks 29, 30 secured by pins 29a, 30a to the spider 5 and having faces at such angles to the radii passing through said blocks as will develop the desired circumferential moments during the outward and inward movements of the segments under centrifugal force to cause them to coact with the driven member flanges 9a, 11a, as already described. In this instance also, there are shouldered interlocks 23a, 24a between each free end of a segment and the cam-controlled end of the adjacent segment, which causes the entire segment to participate in the specially designed movements.
As shown in Figures 4 and 7, each driven member is subdivided into segments. As these driven members are identical in construction, a description of one will suffice for both. As shown in Figure 7, these segments may consist of quadrants 9x with a rim portion 9ax that carries the flange 9a mounted upon said segment through means of resilient bushings 31 entering enlarged openings 32 in the rim segment and secured by rivets 33. The resiliency of the bushings 31 is sufficient to permit the rim members 9ax to be forced outwardly to bring their friction facings against the stationary member of the clutch, as well as to return the rim portion out of frictional engagement when the clutch is released; also to absorb shocks in transmission.

What is claimed is:

1. A transmission of the class described combining rotary driving and driven members, a direct drive between said members including a friction clutch having disengageable rotary elements, a low speed drive for establishing driving connection between said members and including a torque responsive thrust means connected to said friction clutch and operable by predetermined torque resistance in said low speed drive to hold said friction clutch open, and ineffective as a clutch-opening means while said elements of the clutch remain engaged and in the same rotative relationship to each other.

2. A transmission comprising a driving member and a driven member, high and low speed drives each including a centrifugally controlled clutch for automatically establishing driving connection between said members, said high speed drive in the acceleration of the driving member being adapted to take precedence over the low speed drive at a predetermined critical speed of the driving member. a frictional driving connection located between the low and high speed drives and operable to maintain a high speed driving action from the low speed clutch to the driven member when said driving member falls below the critical speed of said high speed clutch, said low speed connection embodying inter-acting torque responsive elements operable to control the opening and closing of said frictional driving connection.

3. An automatic transmission for automobiles and the like comprising, in combination, a rotatable power supply shaft, a driven power output shaft, a high speed friction clutch having driving and driven elements adapted to be engaged to establish a power transmitting relationship therebetween, the driving element of said clutch being connected for rotation by said power supply shaft, a low speed friction clutch having driving and driven elements adapted to be engaged to establish a power transmitting relationship therebetween, the driving element of said low speed clutch being connected for rotation by said power supply shaft, an H-shift-type manually selective change gear transmission having a manually engageable shifting device, said manually selective transmission including a counter-shaft having a non-over-running reduction gear connection with the driven element of said low speed clutch so as to be rotated thereby, a transmission shaft connected to the driven element of said high speed clutch, gearing means including an over-running clutch for driving said transmission shaft from said reduction gear connection, means including gearing and a shiftable member engageable by said shifting device for movement thereby to establish a low speed forward driving connection between said counter shaft and said driven shaft, to disconnect said counter shaft from said driven shaft, or to establish a reverse driving connection between said counter shaft and said driven shaft, a second shiftable member forming a part of said manually selective transmission and engageable by said shifting device to move said second member from a neutral position to a second position to establish a direct forward driving relationship between the transmission shaft of said high speed clutch and said driven shaft, or to a third position, gearing means cooperating with said second member while in said third position to establish an intermediate non-over-running forward driving connection between said counter shaft and said driven shaft, and means connected to said clutches and operable in response to a running function of an engine to engage said low and high speed clutches in succession.

CHARLES F. STAUFFER.
SIMEON BUDLONG.